3,424,997
GAS LASER WITH GAS STORAGE ELECTRODE
Firmin O. Lopez, Santa Clara, and Walter Proskauer, San Francisco, Calif., assignors to Spectra-Physics, Inc., Mountain View, Calif., a corporation of California
Filed Jan. 5, 1966, Ser. No. 518,870
U.S. Cl. 331—94.5                11 Claims
Int. Cl. H01s 3/22

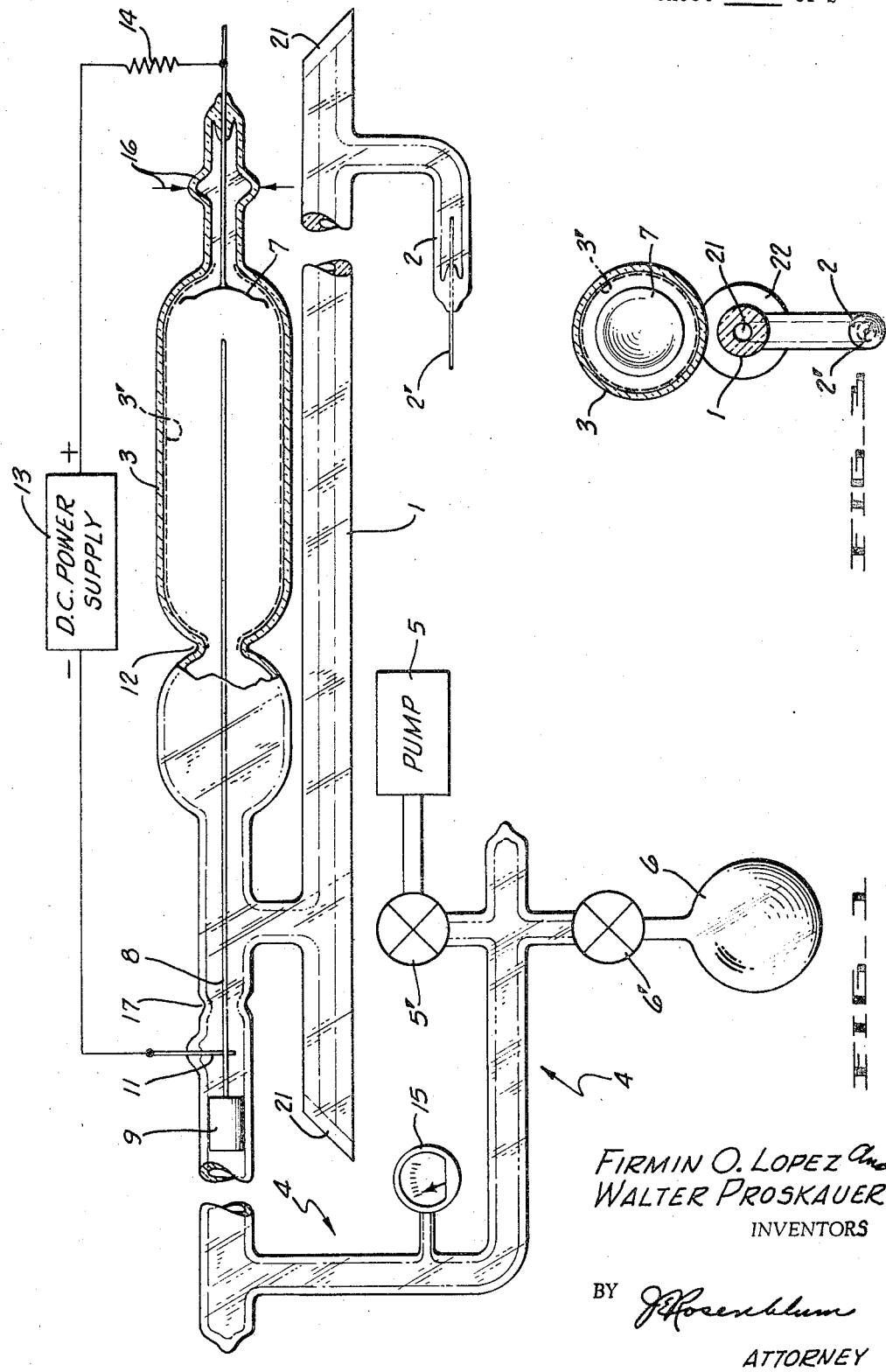

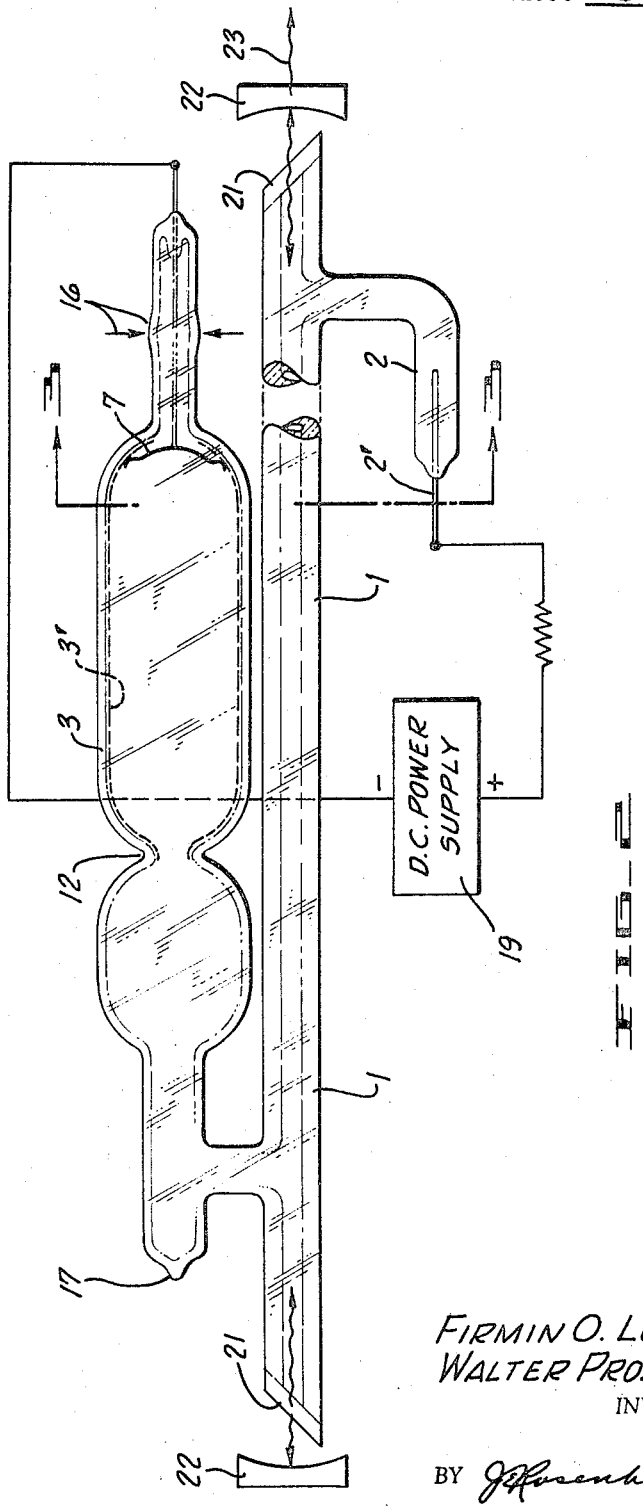

The present invention relates to gas lasers in which electrodes are positioned internal to the gas envelope.

Often it is desirable to use internal electrodes in a gas laser, for example to improve the efficiency of exciting an electrical discharge in the active gaseous medium. However, in view of the fact that gas lasers are typically operated at low pressures on the order of a few torr (mm. of Hg) or less for optimum gain and noise characteristics, the introduction of internal electrodes can reduce the effective operating lifetime of the laser as a result of ion bombardment. In particular, the ions of the low-pressure discharge strike the cathode electrode at high velocities and cause the cathode material to sputter and clean up the active gas. For example, in a gas laser containing a mixture of 90% helium and 10% neon at pressures less than 3 torr, the gas is rapidly cleaned up by the sputtering action of the cathode.

We have discovered that the operating lifetime of an internal-electrode gas laser can be increased significantly by the use of a hollow cathode which is formed of a metal film with atoms of the active gas trapped therein. In operation, the ion bombardment of such a cathode causes the trapped gas to be liberated at a rate which compensates for the gas clean-up.

The various features and advantages of the present invention will become more apparent upon a consideration of the following specification taken in connection with the accompanying drawing, wherein:

FIGURE 1 is a plan view, partly broken away, of a laser plasma tube in accordance with the present invention during the course of processing;

FIGURE 2 is a plan view, partly broken away, of a gas laser in accordance with the present invention, incorporating a plasma tube processed as shown in FIGURE 1; and FIGURE 3 is a cross-sectional view taken along line 3—3 of FIGURE 2.

Referring to one particular example of the present invention, as illustrated in the drawing, an empty helium-neon gas laser plasma tube 1, containing an anode appendage 2 and a cathode appendage 3, is sealed through the cathode appendage to a vacuum processing system 4, including vacuum pump 5 and a gas storage bulb 6 controlled respectively by values 5' and 6', as shown in FIGURE 1. The cathode appendage 3 is typically a glass cylinder with a 1-inch inner diameter. A disc-shaped tantalum spring 7 is supported by a metal wire through the closed end of the cylinder 3 and is spaced a distance of ⅛-inch from the walls thereof. A long tantalum wire 8, 20-mils in diameter, is inserted through the open end of cylinder 3 and is supported along the axis of the cylinder by a magnetic header 9 slideably engaged inside the connecting tubing. The wire 8 rests on, and makes electrical contact with, an auxiliary electrode wire 11 extending through the side of the connecting tubing, and the end of the wire is spaced about 1-cm. from the disc 7. The open end of cylinder 3 is pinched down at 12 to a small opening of about 5-mm. inner diameter. A DC power supply 13, of 3-kv. open-circuit voltage, is connected between disc 7 and electrode 11 through 100-kΩ stabilizing resistor 14.

After the plasma tube assembly is evacuated and baked out, the helium-neon gas mixture is released from bulb 6 until the filling pressure is 0.6 torr, as measured by a suitable pressure gauge 15. The power supply 13 is then activated at a current level of 2 milliamps to create a glow discharge in the gas filling, whereupon the wire 8, connected as a cathode, is bombarded by gas ions from the discharge and sputters tantalum particles through the helium-neon filling to form a thin film 3' on the inside walls of glass tubes 3 with atoms from the gas filling trapped in said film. This sputtering step proceeds, with gas from bulb 6 introduced periodically to maintain the 0.6 torr pressure level, for several hours until the film appears opaque. The existence of the trapped gas in the film 3' causes the film to have an appearance which is dull in comparison to the highly reflecting appearance of a pure tantalum metal film, and results in an electrical resistance for the film of 20 ohms per square unit as compared with a resistance of 0.5 ohm per square for a pure tantalum metal film. The thickness of the film 3' is on the order of a micron. After the sputtering is completed, the folded glass bead 16, which is attached to the support wire for disc 7, is heated and pulled to bring the disc into contact with the part of film which has deposited behind the disc to form a permanent cathode connection. Finally, the remaining part of wire 8 is withdrawn by a magnet which attracts magnetic header 9 through the tube, the tube is filled by bottle 6 to the final filling pressure of 2 torr, and the tube is pinched off and sealed at indentation 17.

Alternatively, the cathode appendage 3 may be sputtered to form film 3' separately from the main plasma tube 1, be removed from the vacuum system, be provided with a fresh cathode connection, and then be joined to the plasma tube and placed on the vacuum system for final processing. Although this simplifies the making of the cathode connection, it increases the risk of contaminating the film 3'.

The final processing plasma tube, as shown in FIGURES 2 and 3, has a sputtered film cathode 3' in the form of hollow cavity with a small opening at indentation 12. In operation, the laser power supply 19 applies a potential to cathode 3' which is negative with respect to anode 2', thereby creating an optically-radiating discharge in the helium-neon filling. Optical radiation at the desired wavelength, for example 6328 Å., is transmitted through vacuum-tight windows 21 and axially reflected in an optical resonator consisting of two optically-facing mirrors 22, which may be the multiple dielectric layer type with maximum reflectance at the operating wavelength. The discharge maintains a population inversion between the energy levels of the neon atoms defining the operating wavelength so that the active gaseous medium provides stimulated-emission gain at this wavelength. Sufficient transmission at the operating wavelength is provided in at least one of the mirrors 22 to form the output laser beam 23. In a typical embodiment, the main plasma tube 1 is 27.5-cm. long with a 2.5-mm. inner diameter, and the power supply 19 provides 1.5 kv. at 6–7 milliamps.

When the positive ions from the discharge bombard the cathode 31 and sputter metal therefrom, some of the gas atoms trapped in the film are liberated. The sputtered metal particles are re deposited on the walls of tube 3 together with other trapped gas atoms. As a consequence of such repeated sputtering and deposition, a pressure equilibrium is established. The particular pressure of the initial filling used for the sputter-processing of film 3' influences the rate of sputtering and the initial concentration of trapped gas in the film. In order to produce a film which comes into rapid equilibrium at a pressure of approximately 2 torr, it has been found that the initial filling should be in the range of approximately 0.5 torr to approximately 1.0 torr.

Perturbations in the electric field distribution within the cathode tend to destroy the uniformity of the sputtered film 3′. However, since the film is deposited on an insulating glass substrate, those portions of the film which experience excessive erosion will eventually become very thin and exhibit high resistance, and at this stage sputtered metal from other portions of the wall can begin to build up on the eroded spot without being re-sputtered until the film thickness is re-established. Thus the cathode film 3′ tends to maintain an equilibrium configuration. If the substrate for the trapped-gas film were metal, eroded spots could continue to sputter fresh metal (not containing trapped gas), thereby undesirably resulting in gas clean-up without a compensating gas liberation.

Ideally the cathode cavity should be in the form of a perfect sphere in order to maintain the most uniform film upon repeated sputtering and deposition. However, the thin film on an insulating substrate permits substantial deviation from this ideal configuration. This is particularly important in view of the fact that a spherical cavity can exhibit substantial plasma oscillations which result in undesired noise in the operation of the laser, a problem which is found to be substantially eliminated by the use of a cylindrical cavity as illustrated in the drawing.

At present, high voltage sputtering, as described above, has been used successfully to form the film 3′. It may be possible to form such a film by other means, such as, for example, by applying heat to a sample of metal within the tube thereby to evaporate metal particles from the sample which diffuse through the initial filling and form the desired trapped-gas film on the walls of the tube.

Although the present invention has been found to be particularly useful for a laser having a helium-neon active medium, it is also applicable to other gas lasers utilizing internal electrodes in which the active gas tends to be cleaned up.

We claim:

1. A gas laser comprising: a contained active gaseous medium; an insulating member; a film of metallic material having gaseous atoms trapped therein, said trapped atoms being of the same element as at least one element of said active gaseous medium, said film contacting said insulating member and being exposed to said active gaseous medium; and means developing an electric potential on said film which attracts ionized atoms from said active gaseous medium for causing said ionized atoms to strike said film and liberate atoms of said element trapped therein to compensate for clean up of said active gaseous medium during use.

2. A gas laser according to claim 1 wherein said active gaseous medium is at a pressure less than 3 torr.

3. A gas laser according to claim 2 wherein said active gaseous medium is a mixture of helium and neon.

4. A gas laser according to claim 1 wherein said potential developing means creates a discharge in said active gaseous medium which provides stimulated emission gain for optical radiation.

5. A gas laser according to claim 4 including a conducting member also exposed to said active gaseous medium, said potential developing means applying a potential to said film which is negative with respect to said conducting member.

6. A gas laser according to claim 1 wherein said insulating member is part of an envelope containing said active gaseous medium.

7. A gas laser according to claim 1 wherein said film is a sputtered film.

8. A gas laser according to claim 1 wherein said metallic material is tantalum.

9. A method of manufacturing a gas laser tube which comprises: filling a tube envelope with gas having atoms of the same element as at least one element of the active gaseous laser medium to be contained in said envelope; passing metal particles through said gas filling onto a substrate for forming on said substrate a film of metallic material with some of said gas atoms trapped therein; and filling said tube envelope with the active gaseous laser medium, said film being exposed to said active medium in order to liberate atoms of said element trapped therein and thereby compensate for clean up of said active gaseous medium during use.

10. A method according to claim 9 wherein said metal particles are provided by applying a negative potential to a metallic member disposed in said tube envelope thereby causing sputtering of said metallic member.

11. A method according to claim 10 wherein said active gaseous medium is a mixture of helium and neon, said first-named filling consists of said mixture at a pressure in the range of approximately 0.5 torr to approximately 1.0 torr and said second-named filling consists of said mixture at pressure of approximately 2.0 torr.

References Cited

UNITED STATES PATENTS

| 2,887,594 | 5/1959 | Rotow | 313—181 |
| 3,394,320 | 7/1968 | Medicus | 331—94.5 |

JEWELL H. PEDERSEN, *Primary Examiner.*

W. L. SIKES, *Assistant Examiner.*

U.S. Cl. X.R.

117—33.3; 350—320